United States Patent Office 2,769,850
Patented Nov. 6, 1956

2,769,850

ALKYLATION REACTIONS

Rex D. Closson, Detroit, Alfred J. Kolka, Birmingham, and Waldo B. Ligett, Pontiac, Mich., assignors to Ethyl Corporation, New York, N. Y., a corporation of Delaware No Drawing. Application March 21, 1952,
Serial No. 277,896

8 Claims. (Cl. 260—668)

This invention relates to alkylation reactions and more particularly to alkylation of the alkyl or cycloalkyl portion of certain carbocyclic compounds.

Alkylation of aromatic hydrocarbons has been carried out in the past chiefly with catalysts of the Friedel-Crafts type such as sulfuric acid, hydrogen fluoride, aluminum chloride, zinc chloride, and the like. This method suffers from the disadvantage that alkylation takes place preferentially on an aromatic nucleus and furthermore extensive rearrangement of the carbon skeleton of the alkylating molecule can take place. More recently a method of alkylating certain hydrocarbons using sodium as the catalyst has been disclosed. In this case alkylation takes place on the side chain of an alkylaromatic hydrocarbon. However, the prior art teaches that only cyclic hydrocarbons having at least two hydrogens on a carbon which is directly attached by a single bond to a nuclear carbon atom which in turn is attached by a double bond to another nuclear carbon atom can be alkylated. The prior art therefore makes no provision for alkylation on the side chain of compounds having only one hydrogen on the carbon which is directly attached to a doubly bonded nuclear carbon atom as exemplified by compounds such as isopropylbenzene, sec-butylbenzene and the like.

An object of this invention is to provide a new method for carrying out alkylation reactions. A further object is to provide a new method for alkylating compounds containing a carbon atom having attached thereto at least one hydrogen atom, said carbon atom being singly bonded to a nuclear carbon atom which in turn is doubly bonded to a second nuclear carbon atom, with alkylation taking place at the first-mentioned carbon atom.

The present invention comprises alkylating, in a carbocyclic compound such as a carbocyclic hydrocarbon, a saturated carbon atom having attached thereto at least one hydrogen atom, said saturated carbon atom being bonded to a nuclear carbon atom which in turn is doubly bonded to a second nuclear carbon atom, the alkylating agent being an olefin and the alkylation being carried out in the presence of an alkali metal hydride. In this specification, the aromatic nucleus is considered to be a system of alternate double and single bonds.

One preferred form of the invention comprises alkylating, in an alkylaromatic compound, a saturated carbon atom alpha to an aromatic nucleus having attached thereto at least one hydrogen atom, said saturated carbon atom being bonded to a nuclear carbon atom, the alkylating agent being an olefin and the alkylation being carried out in the presence of an alkali metal hydride.

An especially preferred form of our invention comprises alkylating alkyl benzenes having in a position alpha to a benzene ring a saturated carbon atom containing at least one hydrogen atom, with the alkylating agent being a non-cyclic monoolefin of not more than 12 carbon atoms, in the presence of an alkali metal hydride and at elevated temperature and pressure. In this preferred embodiment alkylation takes place on the alpha carbon atom.

Another preferred form of our invention comprises the alkylation of an alicyclic compound with an olefin in the presence of an alkali metal hydride. In this embodiment, alkylation occurs on a saturated carbon atom alpha to a nuclear double bond, said saturated carbon atom containing at least one hydrogen atom. The carbon atom alkylated can be either nuclear or extranuclear.

In practicing our invention, a carbocyclic compound of the class described is reacted with an alkylating agent of the class described in the presence of an alkali metal hydride. The carbocyclic compound is readily and smoothly alkylated on the carbon atom indicated above, with formation of products in which at least one hydrogen on the indicated carbon atom is replaced with the alkyl group derived from the alkylating agent. In carbocyclic compounds having more than one hydrogen on the susceptible carbon atom, and in carbocyclic compounds containing more than one such carbon atom, any or all of the possible products can be obtained. Control of the extent and type of alkylation is achieved by variation in reaction conditions and proportions of reactants.

Generally the material to be alkylated comprises a carbocyclic compound such as an aromatic or alicyclic compound having a saturated carbon atom containing at least one hydrogen atom, said saturated carbon atom being bonded to a nuclear carbon atom which in turn is double bonded to a second nuclear carbon atom. The carbon atom to be alkylated can be either cyclic or acyclic in its bonding. Typical compounds in which the carbon atom alkylated is cyclic include cyclohexene, 1-cyclohexylcyclohexene, cyclopentene, tetralin, hydrindene and similar alicyclic and hydroaromatic compounds. Aromatic compounds such as toluene, diphenylmethane, n-butylbenzene and the like alkylate on an acyclic carbon atom alpha to be an aromatic nucleus. Compounds such as 1-methylcyclohexene-1, 5-methyl-1,2,3,4-tetrahydronaphthalene and the like can alkylate on either an acyclic or cyclic carbon atom or both. In compounds such as p-cymene which has one alpha carbon containing three hydrogen atoms and one containing one hydrogen atom alkylation will preferably occur first on the alpha carbon containing three hydrogen atoms. Other examples of typical materials which can be alkylated according to our invention include o-, m- and p-xylenes, trimethylbenzenes, ethylbenzenes, the isomeric diethylbenzenes, n-propylbenzene, o-, m- and p-di-n-propylbenzenes, cumene, 9,10-dihydrophenanthrene, sec-butylbenzene, 2-phenyldodecane, p-methyl-tert-butylbenzene, alpha-methylnaphthalene, n-dodecylbenzene and the like.

As the alkylating agent any non-conjugated olefin compound is satisfactory. Preferably we employ non-cyclic monoolefins of 12 or less carbon atoms. Examples of our preferred alkylating agents are ethylene, propylene, butene-1, butene-2, pentene-1, pentene-2, hexene-1, hexene-2, hexene-3, the various non-cyclic heptenes, octenes, nonenes, decenes, undecenes, dodecenes, isobutylene, 3-methylheptene-1, 2-ethylpentene-1, 3-methylhexene-3 and the like. An especially preferred olefin in our invention is ethylene. In addition to these preferred olefins other olefinic materials such as cylic olefins, non-conjugated polyolefins and monoolefins of more than 12 carbon atoms can also be employed. Typical examples include cyclohexene, cyclopentene, 1,4-cyclohexadiene, 1,5-hexadiene, 1,4-hexadiene, pentadecene-1, other pentadecenes and tetradecenes.

Thus, in carrying out our invention we react, for example, toluene with ethylene and obtain n-propyl benzene, 3-phenylpentane and 3-ethyl-3-phenylpentane. We can control our reaction conditions, as is shown below, to obtain any or all of these products. Similarly, xylenes, upon reaction with ethylene, yield n-propylmethylbenzenes, di-n-propylbenzenes, methyl - 3 - amylbenzenes, methy-tert-heptylbenzenes, di-(3-amyl)-benzenes and di-(tert-heptyl)-benzenes; isoproylbenzenes and ethylene yield tert-amylbenzene; tetralin and ethylene yield 1-ethyl-1,2,3,4-tetraphydronaphthalene, 1,4-diethyl-1,2,3,4- tetrahydronaphthalene, 1,1,4-triethyl-1,2,3,4-tetrahydronaphthalene and 1,1,4,4-tetraethyl-1,2,3,4-tetrahydronaphthalene; cyclohexene with ethylene yields 3-ethylcyclohexene, 3,6-diethylcyclohexene, 3,3,6-triethylcyclohexene and 3,3,6,6-tetraethylcyclohexene; diphenylmethane yields diphenylethylmethane and diphenyldiethylmethane; p-cymene yields p-isopropyl-n-propylbenzene, 3-(p-isopropylphenyl)-pentane, p-isopropyl - tert - heptylbenzene and p-(tert-amyl)-tert-heptylbenzene; alpha-methylnaphthalene and ethylene yield alpha-n-propylnaphthalene, alpha - (3 - amyl) - naphthalene and alpha-(tert-heptyl)-naphthalene. The pattern of alkylation of the other carbocyclic compounds of our invention with ethylene is similar to that illustrated in these examples.

Other examples of processes employing our invention include the reaction of toluene with propylene to produce isobutyl-benzene,ω,ω-(diisopropyl)-toluene and ω,ω,ω-(triisopropyl)-toluene; alkylation of cyclohexene with cyclohexene to produce 3-cyclohexyl-cyclohexene and 3,6-dicyclohexylcyclohexene; and the reaction of cumene with isobutylene to produce 2,3,3-trimethyl-2-phenylbutane. The alkylation of other carbocyclics of our invention proceeds in a similar manner.

Any alkali metal hydride is suitable as a catalyst in our invention. Examples are lithium hydride, sodium hydride, potassium hydride, rubidium hydride and cesium hydride. Because of its cheapness and availablity sodium hydride is the preferred catalyst. Any mixture of alkali metal hydrides may also be employed, such as mixtures of sodium hydride and potassium hydride, or lithium hydride-sodium hydride. The catalyst or catalyst mixture can also be mixed with a supplemental material, or "carrier," such as finely divided glass, refractory oxides, carborundum and the like. In certain modifications of our process, as outlined below, such carrier-catalyst mixtures are preferred.

Since oxygen reacts restructively with our catalysts, it is preferable that the alkylation reaction be carried out in substantially oxygen-free surroundings, and that reactants employed should be low, preferably below about 0.5 percent, in oxygen content. However, our catalysts are affective oxygen scavengers and can be employed in the presence of greater quantities of oxygen, if the catalyst is present in amount in excess of the quantity of oxygen. The amount of catalyst to be employed is dependent to some extent upon the pressure of operation. At higher pressures somewhat smaller amounts of catalyst can be used than are preferable at lower pressures. Generally the amount of catalyst used should be about 0.01 to 10 percent by weight of the amount of carbocyclic compound used, with best results obtained when the amount of catalyst is between 0.1 and 5 percent by weight of the amount of carbocyclic compound.

Our invention is operable at temperatures ranging from about 150 to 500° C. For best results, that is, convenient reaction rate plus avoidance of extensive decomposition, it is preferred to operate at temperatures in the range of about 200 to 375° C.

Our invention is operable over a wide range of pressures. Pressures approaching atmospheric, even as low as about two atmospheres absolute, can be used with satisfactory results. Most favorable results generally are obtained at higher pressures, however, and pressures of about 20 to 3000 atmospheres are usually preferred. Within the preferred pressure range there will be considerable variation depending upon the reactants used and the products desired. Generally with lower olefins, such as ethylene, propylene, butenes, and pentenes, relatively high pressures are preferred due to the high vapor pressure of these materials at the temperatures we ordinarily employ. With higher olefins, having lower vapor pressures, equivalent results can be obtained at somewhat lower pressures. Pressures also play a part in determining the extent of reaction in some cases. In the case of alkylation of toluene with ethylene in the presence of sodium hydride, for example, the following reactions can occur.

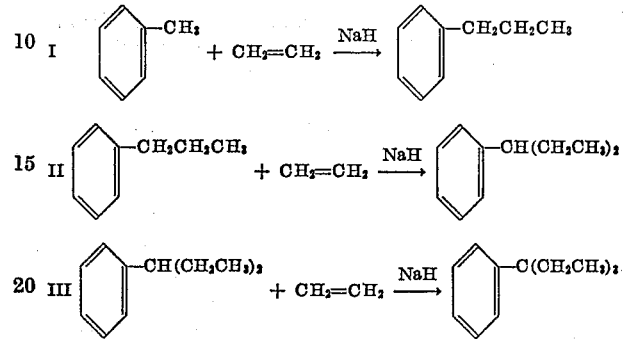

Provided sufficient ethylene is present, the mixture can proceed through all three stages to yield 3-ethyl-3-phenylpentane as the final product. In general, this is favored by higher pressures, with lower pressures favoring the formation of the mono- and di-substitution products. In actual practice, the product obtained will ordinarily be a mixture of all or most of the possible products, but selectivity is achived by applying the above pressure considerations. As mentioned earlier, the amount of catalyst chosen also has some effect upon the choice of pressures to be used.

Our process is equally applicable to the alkylation of mixtures of carbocyclic compounds with olefins, and to the alkylation of carbocyclic compounds with mixtures of olefins, and to alkylation of mixtures of carbocyclic compounds with mixtures of olefins. In these cases, mixtures of products, which can be separated by fractionation, are obtained.

The ratio of alkylating agent to carbocyclic compound can be varied over a wide range. Usually it is preferable to employ an excess over the stoichiometric amount of alkylating agent, but in some cases, as when monoalkylation of a carbocyclic compound capable of polyalkylation is desired, it may be preferable to operate with a stoichiometric deficiency of alkylating agent.

Although we prefer to alkylate a substantially undiluted carbocyclic compound with a substantially undiluted alkylating agent, it is within the scope of our invention to conduct our reaction with either or both of our reactants dissolved in a solvent. The solvent should be one which is inert to the alkylation reaction and which is substantially inert to attack by an alkali metal hydride. Paraffins, cycloparaffins, and aromatics containing no hydrogen-bearing carbon atoms alpha to an aromatic nucleus are examples of suitable solvent types. Specific examples include n-octane, isooctane, cyclohexane, benzene, tert-amylbenzene and tert-heptylbenzenes. Also one of the reaction products can be employed as the solvent, as for example the 3-ethyl-3-phenylpentane of the above graphic example.

In commercial operation, it is particularly attractive to conduct our process in a continuous manner. This can be done by a variety of techniques, such as passing the reactants, either in the liquid or vapor state, or in mixed liquid-vapor state, over a fixed bed of catalyst, either substantially pure or admixed with an inert carrier. The product stream can be purified by distillation in a continuous fractionation column. Alternately, the liquid or liquid-vapor reaction can be carried out in the presence of a suspended catalyst which is transported through the reaction zone of the velocity of liquid reactants and products. In the vapor-phase reaction, the fluidized catalyst bed technique can be utilized; these and other continuous modifications of our invention can be carried out either "once-through" or with recycle of reactants and products. In continuous and batch modifications of our invention, the reactants can be diluted with inert gases, such as propane, ethane, methane, nitrogen, helium, neon and the like.

The following examples will serve to further illustrate the scope and benefits of our invention:

Example I

A pressure autoclave, having a removable cap for charging and discharging liquids and solids, equipped with a plurality of gas inlet and outlet lines, thermocouples, pressure gauges and fitted with a mechanical agitator, was flushed with nitrogen and charged with 950 parts of isopropylbenzene and 21 parts of sodium hydride. The autoclave was closed, heated to 250° C. and pressured to 800 pounds per square inch with ethylene. While keeping the temperature at 250° C. and maintaining the pressure above 600 pounds per square inch by occasional repressuring with ethylene the reaction mixture was stirred for 4.5 hours. During this time a total pressure drop of 720 pounds per square inch was observed. After the autoclave had cooled to room temperature at the end of the run it was vented and the sodium hydride catalyst was destroyed with a mixture of ethanol and water. The organic layer was washed with water, dried, and distilled through a helices packed fractionating column at atmospheric pressure. After obtaining a fraction of 650 parts of unreacted isopropylbenzene boiling at 150° C./735 mm., a fraction of 192 parts of material having a boiling point of 188° C./735 mm. was obtained. This material was identified as tert-amylbenzene by physical properties and by comparison of its infra-red spectrum with that of an authentic sample of tert-amylbenzene prepared by an independent method. The overall yield based on isopropylbenzene actually reacted was 52 percent. The product had refractive index $n_D^{20}$, 1.4965 and specific gravity $d_4^{20}$, 0.874.

When this procedure is carried out at temperatures as low as 150° C. and as high as 500° C. and at pressure as low as two atmospheres or as high as 3000 atmospheres similar results are obtained. Other alkali metal hydrides can be used in varying quantities as catalysts with equally beneficial results. When other olefins such as propylene, butene-2, hexene-1, dodecene-1 and the like are employed in this procedure good yields of 2,3-dimethyl-2-phenylbutane, 2,3-dimethyl-2-phenylpentane, 2,3-dimethyl-2-phenylheptane and 2,3-dimethyl-2-phenyltridecane, respectively, are obtained. When using hexene-1 and dodecene-1, however, the olefin is introduced to the pressure vessel as a liquid. When the process of Example I is carried out with sec-butylbenzene, α-isopropylnaphthalene, 1-methyl-1,2,3,4-tetrahydronaphthalene, 1,4-dimethyl-1,2,3,4-tetrahydronaphthalene, and diisopropylbenzene as the carbocyclic compound the principal products of alkylation are 3-phenyl-3-methylpentane, alpha-(tert-amyl)-naphthalene, 1-methyl-4-ethyl-1,2,3,4-tetrahydronaphthalene, 1,4-dimethyl-1-ethyl-1,2,3,4-tetrahydronaphthalene and p-(tert-amyl)-isopropylbenzene, respectively. In the case of 1-methyl-1,2,3,4-tetrahydronaphthalene minor proportions of 1-methyl-1-ethyl-1,2,3,4-tetrahydronaphthalene, 1-methyl-1,4-diethyl-1,2,3,4-tetrahydronaphthalene and 1-methyl-1,4,4-triethyl-1,2,3,4-tetrahydronaphthalene will also be obtained. In the case of 1,4-dimethyl-1,2,3,4-tetrahydronaphthalene some 1,4-dimethyl-1,4-diethyl-1,2,3,4-tetrahydronaphthalene will be obtained, and with diisopropylbenzene minor amounts of di-(tert-amyl)-benzene will be produced. These minor reaction products are recovered after distillation of the primary product.

Example II

Using the apparatus and procedure of Example I, xylene was alkylated with ethylene in the presence of sodium hydride at a temperature of 250° C. and a pressure of 40-54 atmospheres. After 3.5 hours a 26 percent yield of methyl-n-propylbenzene was obtained based on xylene charged to the reactor. Based on xylene actually reacted, the yield was 85 percent. The product was identified by its physical properties (B. P., 181-182° C./748 mm., $n_D^{20}$ 1.4932, $d_4^{20}$, 0.865) and by oxidation with potassium permanganate to benzene dicarboxylic acids, which were identified by acid number.

This procedure can be carried out at varying temperatures and pressures. At higher pressures, polyalkylation with the formation of di-, tri- and higher alkylated derivatives is favored. These products are readily separated from each other by fractionation. The amount of sodium hydride used at the various pressures can be varied from 0.01–10 percent of the weight of xylene charged, for example, and other alkali metal hydrides also give similar results.

Example III

Using the apparatus and procedure of Example I, toluene was alkylated with ethylene for a period of 4 hours. An 8.4 percent yield based on toluene charged of n-propyl benzene was obtained. Based on toluene consumed, the yield was 37 percent. The product boiled at 156–157° C./748 mm., and had a density of $d_4^{20}$, 0.860, refractive index $n_D^{20}$, 1.4911.

When this procedure is employed at higher pressures, such as 2-3000 atmospheres, substantial amounts of 3-phenylpentane and 3-phenyl-3-ethylpentane are obtained in addition to the n-propylbenzene.

Our invention relates to the production of products useful as chemical intermediates, as solvents, as constituents of blended fuels, etc. In many instances our process makes possible the preparation of compounds which cannot be obtained in a pure state by any other known method.

We claim:

1. In a process for the alkylation with a non-conjugated olefin of a carbocyclic compound containing a saturated hydrogen-containing carbon atom adjacent to an unsaturated nuclear carbon atom, the improvement which comprises conducting said reaction at a temperature of 200–375° C. and at a pressure of 20–3000 atmospheres in the presence of an alkali metal hydride catalyst.

2. The process of claim 1 in which the carbocyclic hydrocarbon is an alkylaromatic hydrocarbon.

3. The process of claim 1 in which the olefin is ethylene and the alkali metal hydride is sodium hydride.

4. Process for the preparation of tertiary amylbenzene comprising reacting isopropylbenzene with ethylene in the presence of sodium hydride as a catalyst, said reaction taking place at a temperature of substantially 250° C. and a pressure of about 50-55 atmospheres.

5. Process for the preparation of methyl-n-propylbenzene comprising reacting xylene with ethylene in the presence of sodium hydride as a catalyst at a temperature of substantially 250° C. and a pressure of about 40-54 atmospheres.

6. A process which comprises reacting toluene with ethylene at elevated temperature and pressure in the presence of sodium hydride as a catalyst and recovering a product formed by replacement of methyl hydrogen by an alkyl group.

7. In a process for alkylating alkylbenzene on an alpha carbon atom containing at least one hydrogen atom with an acyclic monoolefin with not more than 12 carbon atoms, the improvement which comprises conducting said reaction in the presence of an alkali metal hydride catalyst at a temperature of 200–375° C., and at a pressure of 20–3000 atmospheres.

8. In a process for the alkylation with a monoolefinic hydrocarbon of a carbocyclic compound containing a saturated hydrogen-containing carbon atom adjacent to an unsaturated nuclear carbon atom, the improvement which comprises conducting said reaction at a temperature of between about 200–350° C. and a pressure of at least 20 atmospheres in the presence of an alkali metal hydride catalyst.

References Cited in the file of this patent

UNITED STATES PATENTS

| | | |
|---|---|---|
| 2,158,071 | Hansley | May 16, 1939 |
| 2,448,641 | Whitman | Sept. 7, 1948 |
| 2,548,803 | Little | Apr. 10, 1951 |

OTHER REFERENCES

Berkman et al.: *Catalysis*, page 245 (1 page only), Pub. by Reinhold Publishing Corp., New York (1940).